United States Patent
Sehlleier (10) Patent No.: US 9,446,548 B2
(45) Date of Patent: Sep. 20, 2016

(54) DEVICE FOR SUCTIONING OFF WASTE PRODUCTS FROM A PRODUCTION MACHINE

(71) Applicant: Windmöller & Hölscher KG, Lengerich (DE)

(72) Inventor: Thomas Sehlleier, Münster (DE)

(73) Assignee: WINDMÖLLER & HÖLSCHER KG, Lengerich (DE)

( * ) Notice: Subject to any disclaimer, the term of this patent is extended or adjusted under 35 U.S.C. 154(b) by 0 days.

(21) Appl. No.: 14/425,935

(22) PCT Filed: Aug. 16, 2013

(86) PCT No.: PCT/EP2013/067107
§ 371 (c)(1),
(2) Date: Mar. 4, 2015

(87) PCT Pub. No.: WO2014/037206
PCT Pub. Date: Mar. 13, 2014

(65) Prior Publication Data
US 2015/0224698 A1    Aug. 13, 2015

(30) Foreign Application Priority Data

Sep. 4, 2012  (DE) .................. 10 2012 108 196

(51) Int. Cl.
| | |
|---|---|
| B65G 53/24 | (2006.01) |
| B29C 47/08 | (2006.01) |
| B29B 17/00 | (2006.01) |
| B29C 47/34 | (2006.01) |

(Continued)

(52) U.S. Cl.
CPC ....... *B29C 47/0881* (2013.01); *B29B 17/0005* (2013.01); *B29C 47/0808* (2013.01); *B29C 47/0811* (2013.01); *B29C 47/0877* (2013.01); *B29C 47/0894* (2013.01); *B29C 47/34* (2013.01); *B65G 53/26* (2013.01); *B65G 53/42* (2013.01); *B65G 53/52* (2013.01); *B29C 47/0026* (2013.01); *Y02P 70/263* (2015.11); *Y02W 30/62* (2015.05)

(58) Field of Classification Search
USPC ................... 226/97.4; 406/73, 113, 117, 151
See application file for complete search history.

(56) References Cited

U.S. PATENT DOCUMENTS

| | | | | |
|---|---|---|---|---|
| 589,106 | A | * | 8/1897 | Weber .................... A01D 46/10 15/314 |
| 1,597,505 | A | * | 8/1926 | Bauer .................... B65G 51/40 406/115 |

(Continued)

FOREIGN PATENT DOCUMENTS

JP    H01 109018    *  7/1989

*Primary Examiner* — Joseph Dillon, Jr.
(74) *Attorney, Agent, or Firm* — Porzio, Bromberg & Newman, P.C.

(57) ABSTRACT

A device for suctioning of waste products of a production machine, particularly a sheet extruder, with a suction chamber. At least one suction element extends into a suction space located outside the suction chamber in order to convey waste products in the suction chamber. A suction unit develops a negative pressure in the suction chamber. A sealing means abuts the suction element and locks the suction chamber in a way such that the suction element is movable along the sealing means. The position of the suction element at the suction chamber is variably adjustable.

21 Claims, 9 Drawing Sheets

(51) Int. Cl.
  *B65G 53/42* (2006.01)
  *B65G 53/52* (2006.01)
  *B65G 53/26* (2006.01)
  *B29C 47/00* (2006.01)

(56) References Cited

U.S. PATENT DOCUMENTS

| | | | | |
|---|---|---|---|---|
| 1,605,908 A * | 11/1926 | Allen | ............ | B65G 53/00 406/100 |
| 3,757,426 A * | 9/1973 | Candor | ............ | D06F 35/00 34/251 |
| 3,759,580 A * | 9/1973 | Ott | ............ | B65G 53/521 406/105 |
| 4,249,131 A * | 2/1981 | Owen | ............ | G01R 29/24 324/452 |
| 4,285,445 A * | 8/1981 | Vander Molen | .... | A01M 7/0092 222/133 |
| 4,815,955 A * | 3/1989 | Krall | ............ | B29C 49/2408 156/572 |
| 4,976,288 A * | 12/1990 | Steele | ............ | B65G 53/521 138/120 |
| 5,093,984 A * | 3/1992 | Lape | ............ | H05K 13/0061 29/741 |
| 5,242,059 A * | 9/1993 | Low | ............ | B07C 5/362 198/370.12 |
| 5,603,775 A * | 2/1997 | Sjoberg | ............ | B08B 3/022 134/122 R |
| 5,644,986 A * | 7/1997 | Gydesen | ............ | B41F 35/02 101/424 |
| 6,036,408 A * | 3/2000 | Wilhelm | ............ | B65B 69/0075 406/113 |
| 6,110,410 A * | 8/2000 | Owens | ............ | A61M 5/14224 156/274.4 |
| 6,942,133 B2 * | 9/2005 | Frankeberger | ............ | B65G 51/02 226/7 |
| 8,083,854 B2 * | 12/2011 | Cirette | ............ | F04B 53/12 118/715 |
| 8,147,616 B2 * | 4/2012 | Wu | ............ | B08B 1/04 134/21 |
| 8,497,447 B2 * | 7/2013 | Heiml | ............ | B23K 37/047 219/121.41 |
| 2005/0022415 A1 * | 2/2005 | Yancey | ............ | C04B 18/241 34/221 |
| 2007/0227956 A1 * | 10/2007 | Wietham | ............ | B01D 33/073 210/136 |
| 2009/0288938 A1 * | 11/2009 | Rodriguez Hernandez | ............ | C10B 47/32 201/25 |
| 2010/0151586 A1 * | 6/2010 | Bauer | ............ | B01L 3/0262 436/180 |

* cited by examiner

DEVICE FOR SUCTIONING OFF WASTE PRODUCTS FROM A PRODUCTION MACHINE

The invention relates to a device for suctioning of waste products of a production machine, particularly a sheet extruder, with a suction chamber at which at least one suction element is assembled, which extends into a suction space located outside the suction chamber in order to convey waste products in the suction chamber and a suction unit in order to develop a negative pressure in the suction chamber.

From the state of the art diverse suction devices are known in order to extract waste products from a production machine. For example, suction pipes are in use which serve as suction elements wherein the pipes can be manually adjusted in its position in order to be able to effectively extract accumulating waste products at the production machine. These pipes flow into a main pipe in which a negative pressure is produced by a fan. Disadvantageously in this main pipe partly problematic geometries occur. Moreover, disadvantageously with the known suction device irregular velocity and pressure fields in the main pipe occur and in the single suction elements, which is not desired or has to be avoided, since for example, the risk exists that the suction device can be blocked by waste products, or that the occurring waste products cannot be reliably sucked from the production machine, particularly the suction space.

The objection of the present invention is to avoid said disadvantages, particularly to establish a device of said manner, which reliably sucks occurring waste products of a production machine, wherein at the same time a blocking addiction within the suctioning device is reduced.

The objection of the present invention is solved by all features of claim 1. In the depending claims advantageous embodiments are described.

According to the invention it is intended that a sealing means, which abuts at the suction element and locks the suction chamber is performed in a way that a suction element is movable along the sealing means wherein the position of the suction element at the suction chamber is variably adjustable. It is particularly an advantage that the suction element can be variably moved and adjusted at the suction chamber in its position in order to be flexibly applied in different production machines. This means that the position of the suction element can be positioned corresponding to the space where the waste products of the production machine occur. At the same time the sealing means provides that independent from the position of the suction element a reliable sealing of the suction chamber is ensured, so that the throughput of the suction device is not negatively disturbed or influenced by the position of the suction element. Thereby blockages within the suction chamber can be effectively avoided since the sealing element ensures a sealing of the suction chamber particularly independent from the position of the suction element.

Moreover it can be an advantage that the sealing means comprises an opening for the suction element, so that at least partially the suction element extends through the opening of the sealing means. In the area of the opening the sealing means advantageously contacts the suction element, so that at this position a sealing occurs.

In order that the suction element can be individually adjusted in its position relative to the suction chamber, the suction chamber can comprise a bearing at which the suction element is movably mounted. For example, it is possible that the bearing is performed as a rail system. For example, it can be possible in one embodiment of the invention that the suction element can be linear displaced along the suction chamber.

An action improving the invention can intend that the suction element is displaceable along the sealing means wherein during the movement of the suction element the position of the opening of the sealing means follows the movement. This means that during movement of the suction element areas of the sealing means, which were previously locked, are opened and thereby offering a corresponding opening for the suction element. At the same time the opening of the suction means is closed through which the suction element previously projected. In a possible embodiment of the invention the suction device can be performed in a way that the sealing means comprises a seam, which opens during the movement of the suction element at a defined position and at the same time closes at a defined position. Hereby the sealing means is performed in a way that the closed seam reliably locks the suction chamber from the external area so that almost no pressure loss occurs during the operation due to the present seam.

For example, the sealing means can be performed as a blind seam wherein during the movement of the sealing means the blind seam can be rolled on and/or rolled up so that the blind seal acts at positions where the suction element is not located and thereby reliably seals the suction chamber. Normally two blind seals are assigned to the suction element wherein during the movement of the suction element along the suction chamber one of both blind seams rolls up and the other rolls on.

Alternatively the sealing means can be performed as a sealing with a zipper, which during the movement of the suction element opens and/or closes. Also here like with the blind seal it is provided that with one suction element two sealing means with each a zipper are intended.

Moreover the device according to the invention can comprise a sealing means, which is performed from telescope elements, which during the movement of the suction element telescope-like extend and/or retract in its particular position wherein at the same time the telescope elements provide a reliable sealing of the suction chamber.

In another alternative of the invention the sealing means can comprise zip lock, magnetic tapes and/or a hook-and-loop fastener in order to correspondingly seal the sealing means during movement of the suction element along the suction chamber or provide a defined opening for the suction element.

Likewise, the invention can provide that the sealing means comprises clap segments, which open during the movement of the suction element along the suction chamber namely in the area of the opening through which the suction element projects. At these positions where the suction element is not located in the area of the sealing means the flap segments are retracted or in a locking position and serve for a reliable sealing of the suction chamber. Alternatively and/or additionally, the sealing means can be a profile gasket, which comprises a seam along which the suction element can be displaced. Correspondingly to the position of the suction element openings are generated at the sealing means. The adjacent areas of the sealing means are however closed.

In another advantageous embodiment of the invention the suction chamber comprises a tapered shape in its cross section, wherein the cross section of the suction chamber is greater at the side facing the suction unit as the cross section at the side averting the section unit. This embodiment can particularly be advantageously when multiple suction elements are assembled at the suction chamber. Hereby it is achieved that in the suction chamber an even current is generated during the operation of the device according to the invention. In this correlation it has been shown that a conical shape of the suction chamber is advantageous. This conical geometry prevents that the flow speed between the single suction elements extremely declines. Further, it is effectively avoided that disturbing turbulences occur in the suction chamber and in the suction elements.

Further, it can be intended that the suction element comprises a pipe and a foot wherein the suction element is mainly assembled outside the suction chamber and the foot is assembled underneath the sealing means within the suction chamber wherein particularly the foot is shaped planar and abuts against the sealing means in the inside of the suction chamber.

The foot and the pipe can be form and/or force and/or positively connected to one another. For example, it is possible that the pipe is welded or screwed with the foot. The foot can be shaped as a plate wherein at the same time the foot comprises a certain sealing function since it is arranged underneath or above the sealing means and additionally serves especially at the critical position of the opening that the suction chamber is sealed from its surrounding. The foot can also serve as a guiding aid for the suction element.

Moreover, the invention can further comprise that the suction element comprises a carriage, which affects at the bearing, which is assembled outside the suction chamber. The carriage enables that a reliable position displacement of the suction element is possible along the bearing. Moreover it is possible that resting means are intended, which fix the position of the carriage at the suction chamber so that an undesired position displacement of the carriage is excluded.

The invention can further be developed in a way that the suction element comprises an inlet area, which is extending in the suction space and an outlet area, which is directed in the direction of the suction chamber wherein particularly the outlet area is tangentially directed to the suction chamber. The tangential inlet of the suction element with its outlet area into the suction chamber has the advantage that an extreme area of low pressure is avoided shortly previous to the inlet into the suction chamber, which disadvantageously can induce clogging.

Moreover, it can be intended that the suction element comprises a curved distribution wherein at least a wall can be intended within the suction element in a way that a flow resistance occurs at the wall, which serves that a remaining of waste products within the suction element is avoided. For example, the device according to the invention can be developed in a way that at least a cover as a wall extends in the suction element particularly in the curved pipe. Alternatively and/or additionally, the wall can be performed as a guide plate, which at least partially influences the geometric contour of the suction element particularly that the guide plate is tilted towards the opening of the inlet area of the suction element. The wall serves for increasing the flow resistance within the suction element particularly previous to the inlet into the suction chamber. During the operation of the device according to the invention a dynamic pressure occurs at the wall, which surprisingly directs the waste products, which are sucked by the device according to the invention into the centre of the suction element. Thereby, it is not resulting that the waste products get caught at the inner wall of the suction element and particularly a congestion is generated due to present depressions.

Advantageously the bearing can comprise a rail element whereby particularly the suction element is linear displaceable. Moreover it is possible that the carriage comprises a handle in order to manually displace the suction element along the suction chamber. Additionally and/or alternatively, the invention can further comprise that the carriage is moveable by a gear particularly an electric gear.

In dependence from the production machine it can be an advantage that a majority of suction elements is assembled at the suction chamber. The suction elements can be variably adjusted in its position to the suction chamber.

Advantageously the suction element is demountable adjusted at the suction chamber. This has the advantage that during maintenance the suction element can be released and disassembled from the suction chamber without long assembly time.

Advantageously the suction chamber can compromise a rectangular form in its cross section. It has been shown that the suction chamber is further enhanceable by the rectangular cross section form whereby in its interior a relatively constant flow rate dominates and areas with increased low pressure and turbulences can be avoided, which otherwise would let arise an accumulation of waste products within the suction chamber whereby the congestion addiction would be inclined.

Moreover, the invention can comprise that the inlet area of the suction element comprises a rectangular cross section wherein particularly the pipe extending from the inlet area comprises a circular cross section. Advantageously it has been shown that the incurring waste products in the suction space directly pour in the respective suction element and no turning of the waste products occurs. This causes that the waste products are mainly kept in the centre of the suction element during the suction and it is avoided that the suction element applies at the inner wall of the suction element and possibly remains at this place, which would be in connection with the congestion.

With the production machine it can be a matter of a machine for the generation of flexible packaging. It is possible that the production machine is one of the following machines: blow-film and cast-film facility, flexo and gravure printing machine, machine for refinement and processing of paper, film and synthetic texture, packaging machine. In such production machines it normally occurs that the to be generated flexible packaging must be trimmed by cutters. Hereby waste products are generated, which are suckable by the device according to the invention. It has been shown that the device according to the invention is especially suitable for machines, which generate films. The suction device according to the invention is able to effectively remove production residues (=waste products) from the producing machine. The waste products can advantageously be continuously be conveyed to a waste collecting area. Since the waste products can vary in their surface composition, particularly can be sticky or stump or even, it is necessary that an ideal current within the suction chamber and within the suction elements is achieved by the device according to the invention. This is achieved by the previously described features so that a reliable suction of the suction space can be achieved without the fact that the waste products cause a congestion within the suction chamber or the suction elements.

Moreover, the previously described objection of the invention can be solved by a production machine with a device for suction of waste products wherein the device comprises the following features:

a suction chamber at which at least one suction element is assembled, which is projecting in a suction space arranged outside the suction chamber in order to convey waste products into the suction chamber,
a suction unit in order to generate a low pressure in the suction chamber,
wherein a sealing means, which abuts against the suction element and which closes the suction chamber is performed in a way that the suction element is moveable along the sealing means whereby the position of the suction element is variably adjustable at the suction chamber.

It has been shown that the integration of the device according to the invention into the existing production machine is very important wherein the position of the suction device has to be chosen that no other control elements are disturbed or covered. Moreover, it has to be ensured that reliable suction of the waste products, which occur in a production machine is ensured. Hereby a positioning gear can be intended, which enables a horizontal or vertical position dislocation of the suction device according to the invention at the production machine.

Further advantages features and details of the invention result from the subsequent description, in which with reference to the drawings embodiments of the invention are described in detail. Thereby, the features described in the claims and in the description can be each single for themselves or in any combination be essential for the invention. It is shown:

Figure 1:
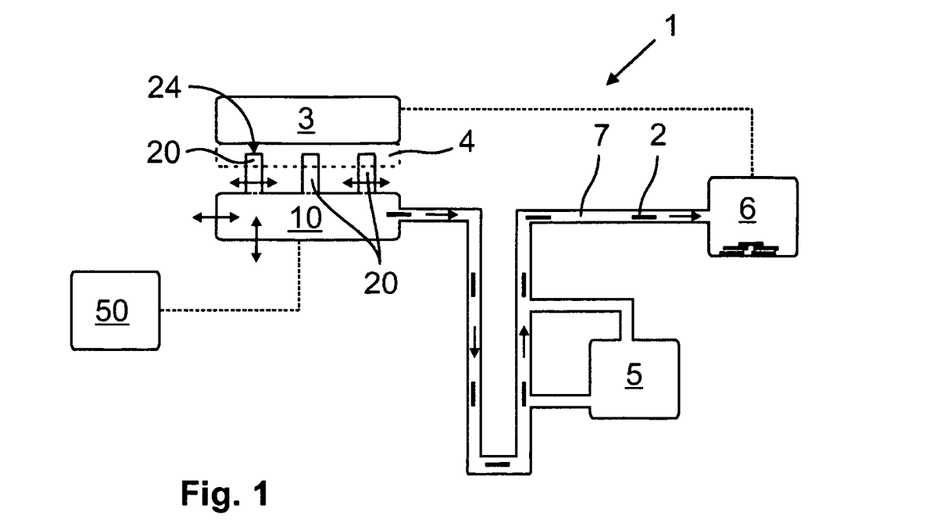
FIG. 1 an schematic drawing of a production machine with a suction device.

FIG. 1 shows the device 1 for suction of waste products 2 in a production machine 3. The production machine 3 can be a machine for the production of flexible wrapping, in which waste products 2 occur during the production, which have to be removed from the production machine 3 since otherwise potential disturbances during the production or during the operation of the production machine 3 can occur. By the production machine 3 it can be a blow-film and cast-film facility, flexo and low pressure machine, a machine for the improvement and treatment of paper, film and plastic fabrics or a wrapping machine. The waste products 2 can consist of plastic or paper. Hereby the surface composition of these waste materials 2 can vary. For example, it is possible that the waste products 2 are sticky and/or stump and/or even.

In order to convey this waste products 2 target oriented from the area of the production machine 3 a device 1 for suction these waste products 2 is intended, which projects with the majority of suction elements 20 in a suction space 4 of the production machine 3. It is a suction unit 5 intended, which generates a low pressure within the suction chamber 10, which is current-like connected with the suction elements 20. Due to the generated low pressure in the suction chamber 10 accumulating waste products 2 can be efficiently sucked within the suction space 4. The suction chamber 10 is connected with a pipe system 7, which communicates with the blower 5. Moreover, a collecting tray 6 is intended, in which the waste products 2 are collected. For example, it is possible that the waste products 2 collected in the collecting tray 6 are automatically redelivered to the production process of the production machine 3, which is schematically indicated with a doted arrow according to FIG. 1.

Moreover, a positioning gear 50 is in a mechanically positive connection with the device 1 particularly with the suction chamber 10 in order to achieve an ideal position at the production machine 3. The positioning gear 50 is able to horizontally and vertically adjust the device 1 at the production machine 3 and moves the single suction elements 20 in the desired position.

Figure 2:
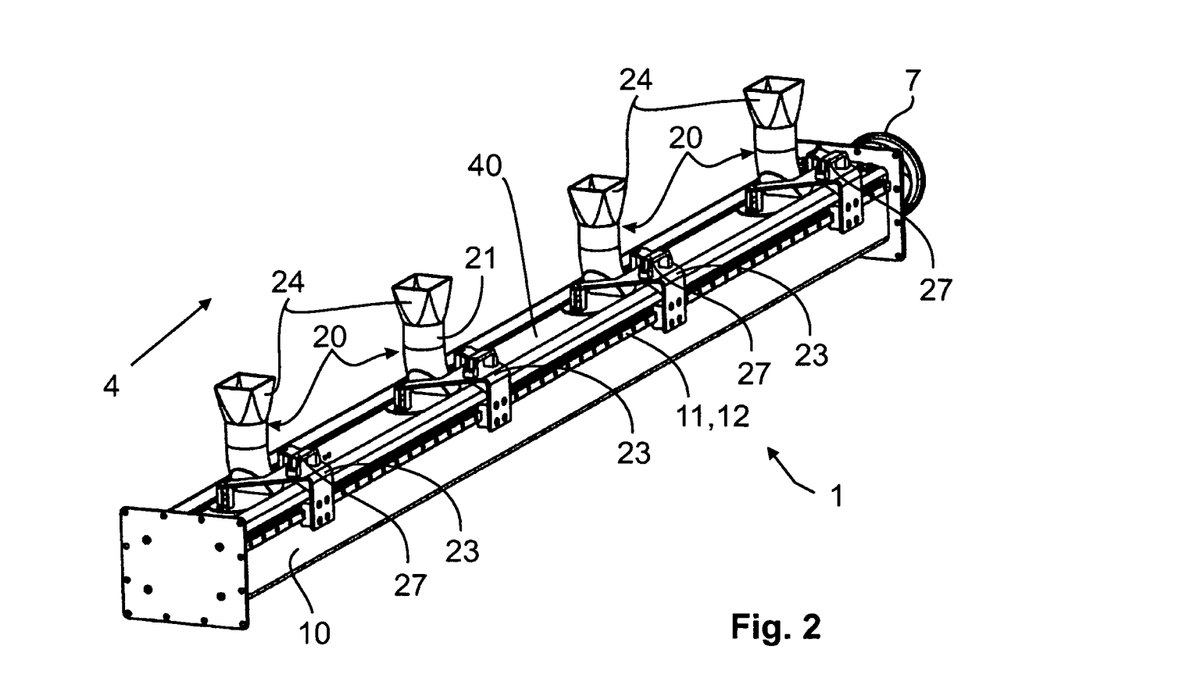
FIG. 2 a possible embodiment of a suction device, which is installable according to FIG. 1, FIG. 3 a lateral view of FIG. 2, FIG. 4 a top view of the device according to FIG. 2, FIG. 5 a suction element of the suction device according to FIG. 3 in an enhanced view, FIG. 6 a further view of the suction element according to FIG. 5, FIG. 7 a schematic drawing of a part of a suction device with a suction element, at which a sealing element abuts, FIG. 8 a further alternative concerning the sealing means, FIG. 9 a further embodiment of a possible sealing means in the suction device, FIG. 10 a further embodiment of a possible suction means, which is used in a suction device, FIG. 11 a further alternative of a possible suction means, which is used in the suction device, FIG. 12 an alternative embodiment of a sealing means in a suction device, FIG. 13 a further embodiment of a sealing means in a suction device, FIG. 14 a further embodiment of a sealing means in a suction device, FIG. 15 a schematic drawing of a suction chamber of the suction device, FIG. 16 a further alternative relating to the geometric form of the suction chamber of the suction device and FIG. 17 a possible embodiment of the suction element of a suction device.
Figure 3:
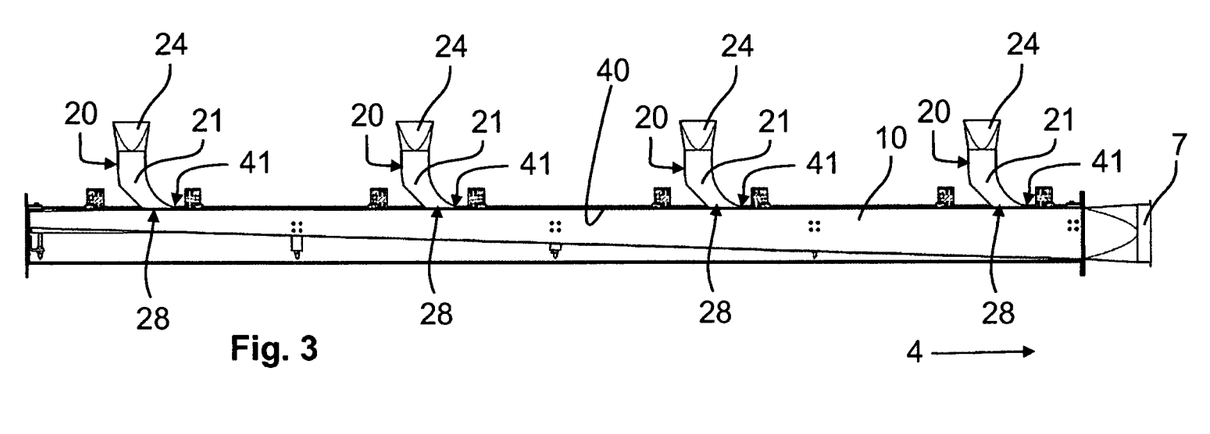
Figure 4:
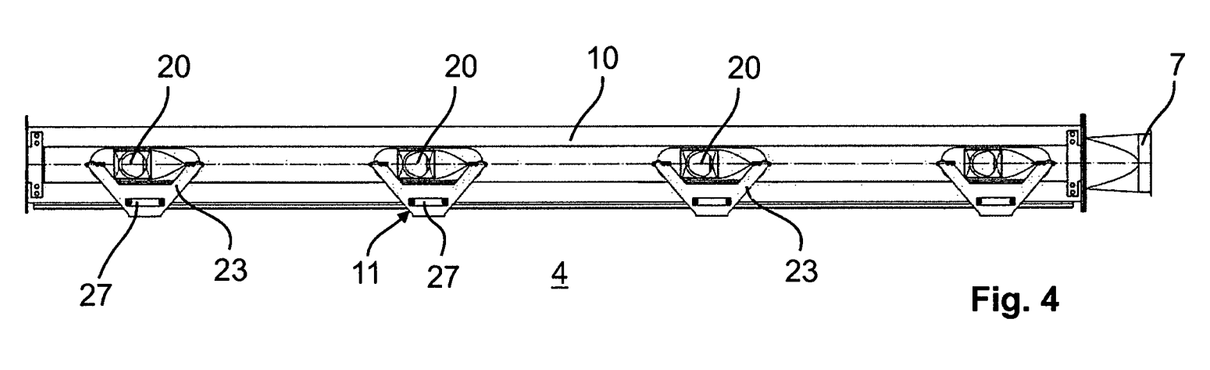

The device 1 according to the invention offers the possibility to assemble a majority of suction elements 20 at the suction chamber 10 in order to individually achieve an ideal suction of the accumulating waste products 2 for every possible production machine 3. According to the FIGS. 2 to 4 exemplary four suction elements 20 are intended. A characteristic of the suction elements 20 according to all embodiments is that each suction element 20 is relatively displaceable towards the suction chamber 10. This means that the suction element 20 can be moved along the suction chamber 10.

In order that a defined low pressure within the suction chamber 10 is adjusted, a sealing means 40 is intended, which mainly closes the suction chamber 10 from the outside. The sealing means 40 only comprises an opening 41 in the area of the respective suction element 20 so that at least partially the suction element 20 projects through the opening 41 of the sealing means 40. Operator conveniently each suction element 20 can be displaced along the sealing means 40 wherein during the movement of the suction element 20 the position of the opening 41 of the sealing means 40 moves along. Hereby different embodiments of the sealing means 40 are possible, which are shown according to FIGS. 7 to 14.

Figure 7:
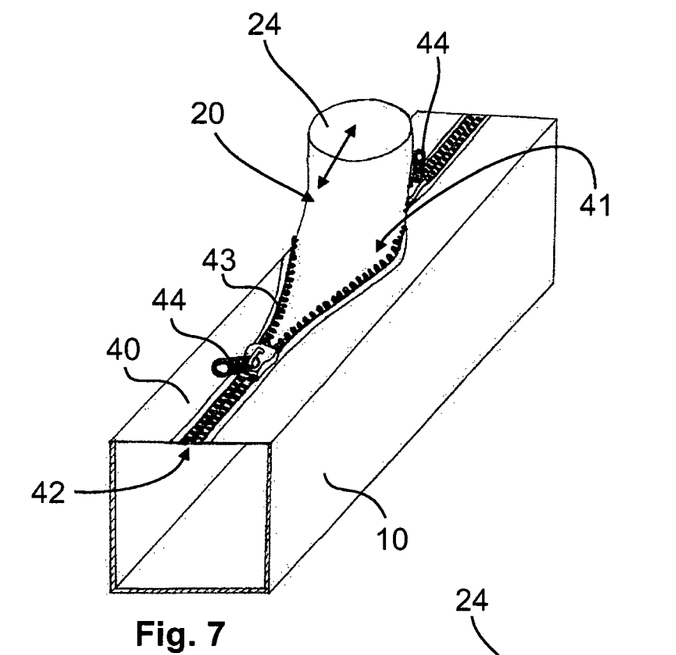

The sealing means 40 comprises according to FIG. 7 a zipper 43, which automatically opens or closes during the movement of the suction element 20. Hereby the suction element 20 comprises a carriage 23, which is for example shown in FIGS. 2 and 4. The suction chamber 10 comprises a bearing 11, at which the suction element 20 is moveably mounted. In the shown embodiment the bearing 11 is performed as a rail system. The carriage 23 affects at the rail system 11, which is assembled outside the suction chamber 10. Moreover, the carriage 23 comprises a not explicitly shown connection element, which connects the carriage 23 with the zipper opener 44. By a movement of the carriage 23 at the same time the zipper opener 44 is opened or closed.

Advantageously an airproof zipper 43 is applied. The rail system 11 further comprises a rail element 12, at which the carriage 23 is mounted and can be securely displaced. The rail element 12 is assembled outside at the suction chamber 10.

Figures 9, 10:
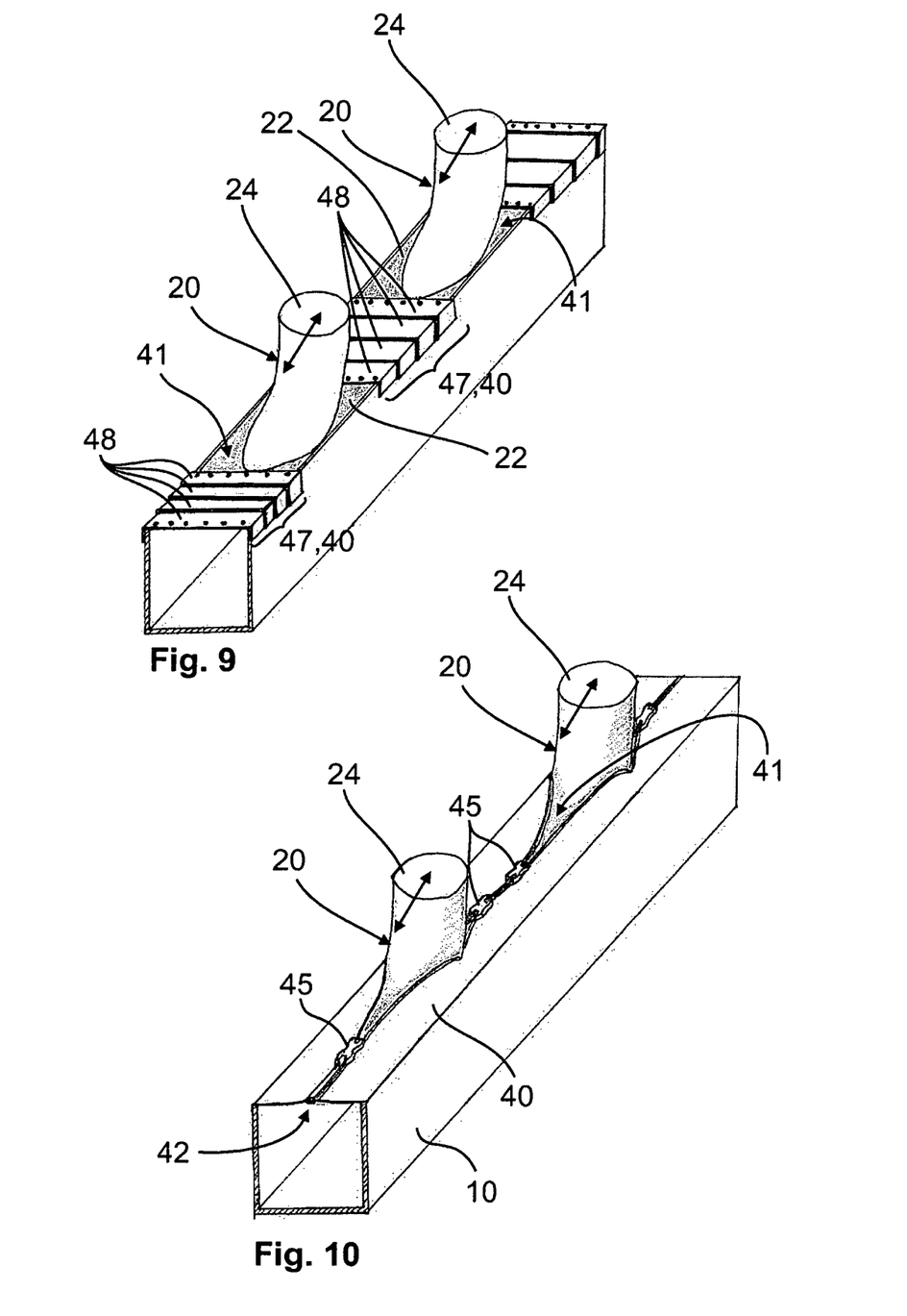

The embodiment according to FIG. 10 works with the same principle like FIG. 7 wherein in contrast to FIG. 7 the sealing means 40 comprises a zip lock 45.

Figure 8:
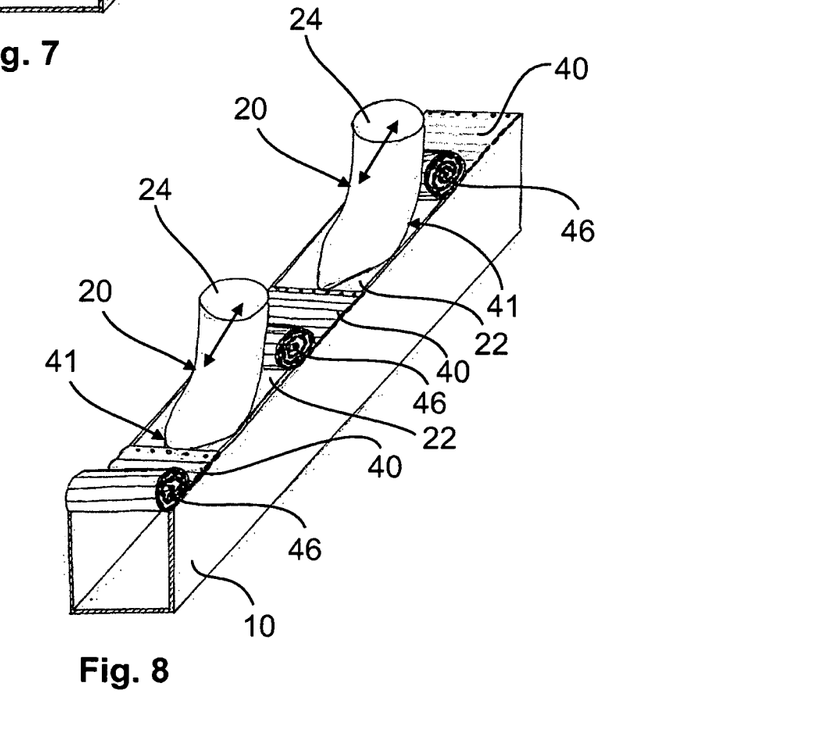

In FIG. 8 the sealing means 40 comprises multiple blinding sealings, which can be rolled up and rolled down about an axis 46 if the suction element 20 is displaced in its position along the suction chamber 10.

In FIG. 9 the sealing means 40 comprises multiple telescope units 47, which each are assembled from multiple telescopic elements 48, which are telescopically displaceable. Likewise the displacement of the single telescopic elements 48 occurs by a corresponding movement of the suction element 20 along the extension of the suction chamber 10.

Figures 11, 12:
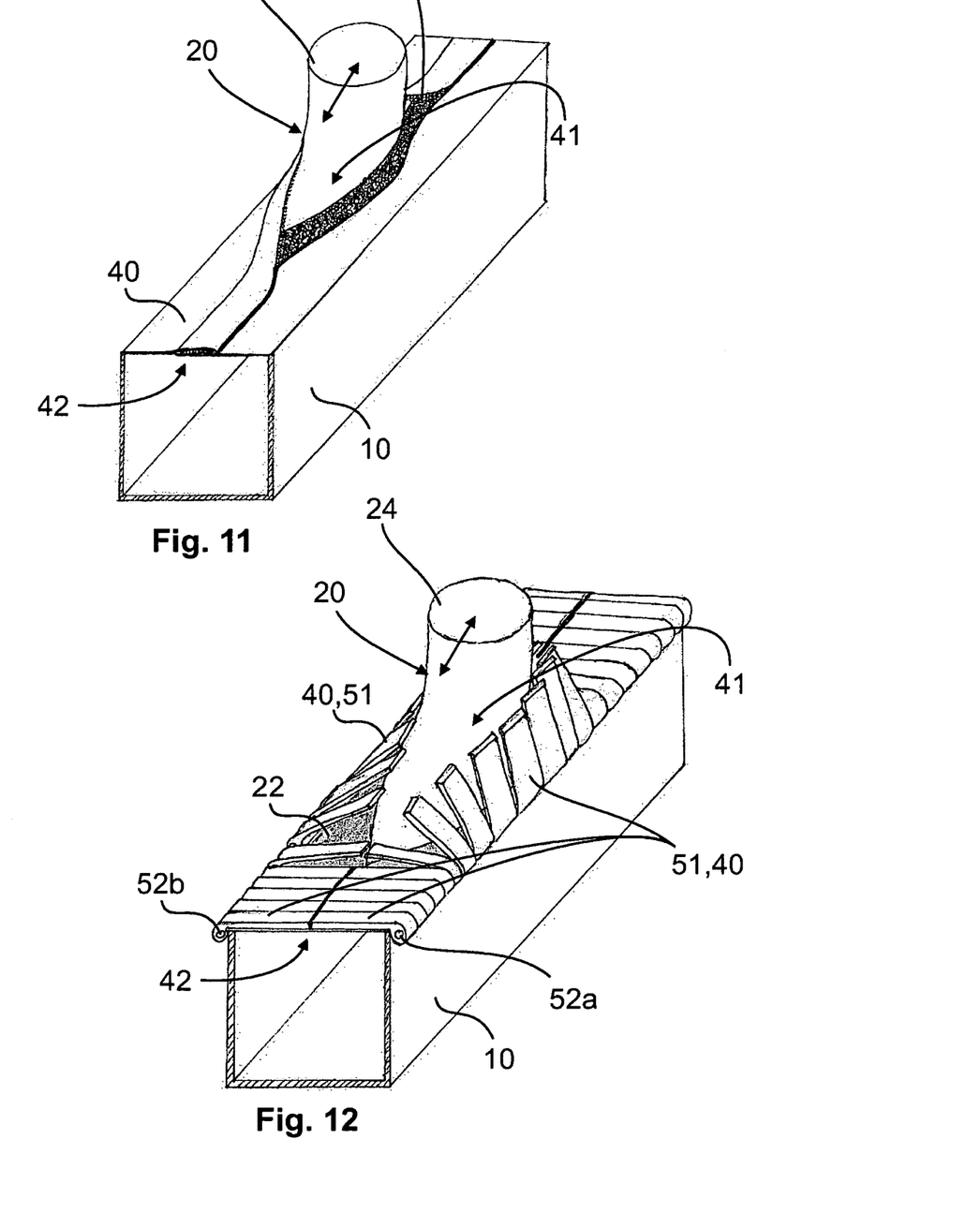

According to FIG. 11 a sealing means 40 is shown, which comprises a hook-and-loop fastener 49 which is opened by a movement of the suction element 20 wherein the hook-and-loop fastener 49 is automatically closing again.

FIG. 12 shows a sealing means 40 with the plurality of flap segments 51, which are assembled adjacent and opposite to one another. Each flap segment 51 can be deviated about an axis 52a, 52b, namely when the suction element 20 deviates the flap segment 51 due to his contour from the retracted position (rest position) in an expanded position. If the suction element 20 no longer affects the flap segment 51 the flap segment 51 moves back in its resting position.

Figure 13:
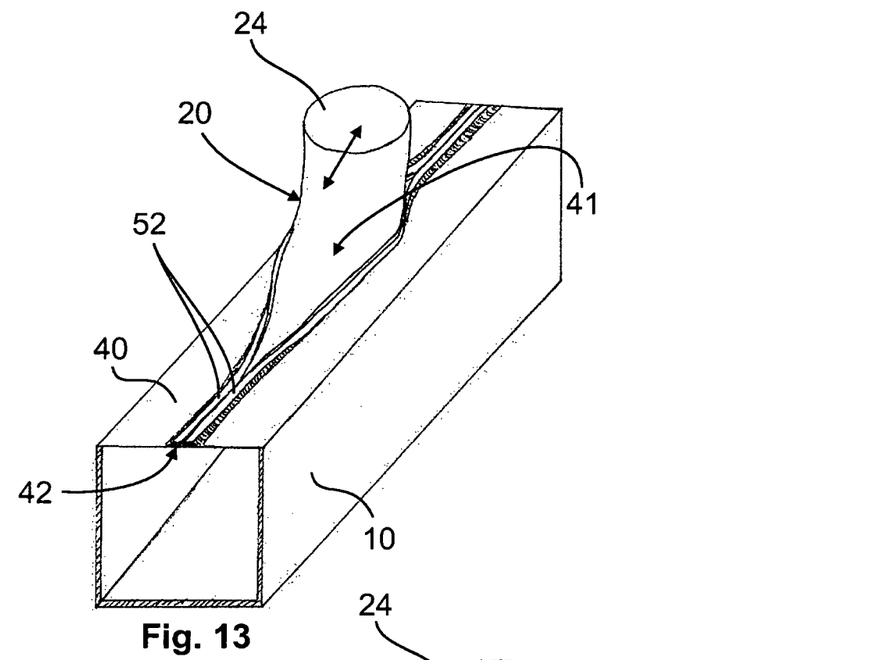

In FIG. 13 the sealing means 40 comprises magnetic tapes 52 which open during a movement of the suction element 20 and thereby provide an opening 41 for the suction element 20. Likewise as in the previously described embodiments an automatic closure of the opening 41 occurs by the sealing means 40 in which the magnetic tapes 52 again affect one another so that a reliable sealing of the suction chamber 10 is ensured.

Figure 14:
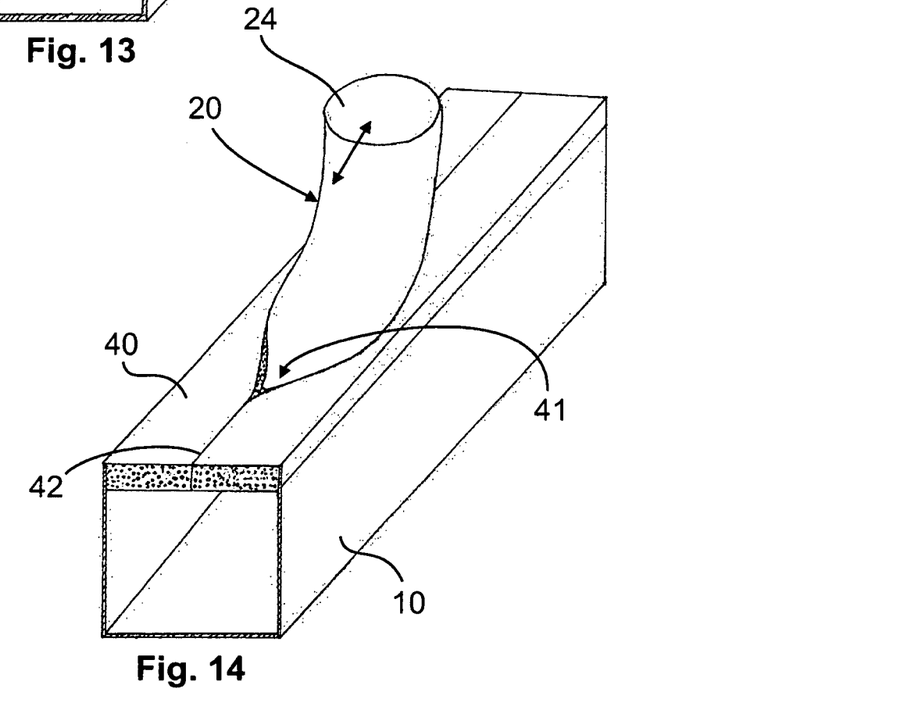
Figure 15:
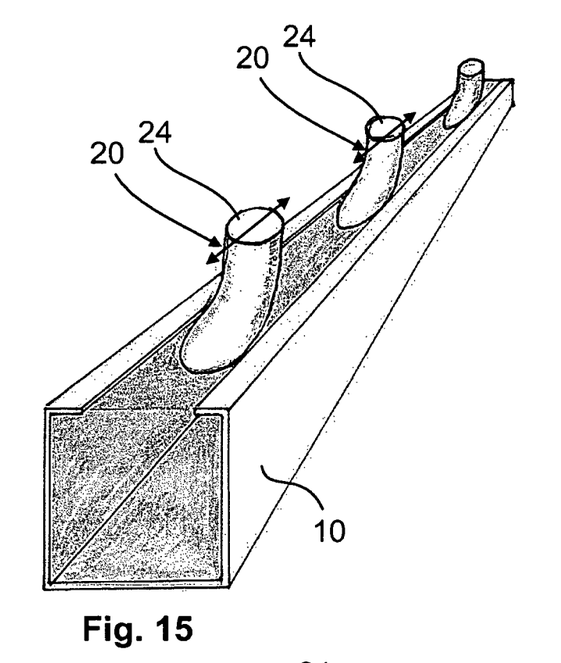

In FIG. 14 the sealing means 40 is performed as a profile sealing, which opens or automatically closes again in dependence of the position of the suction element 20.

Except the embodiment according to FIG. 8 and FIG. 9 all embodiments according to FIG. 7, FIGS. 10 to 14 comprises seam 42, which is opened and closed by a movement of the suction element 20. Hereby the suction element 20 always projects through the opening 41 of the sealing means 40.

In order that a reliable sealing of the suction chamber 20 is available during the operation of the device 1 the area of the opening 41 is additionally covered by a foot 22 of the suction element 20. The foot 22 can at the same time serve as a guidance within the suction chamber 10 in order to ensure a reliable position displacement of the suction element 20. The foot 22 is located directly underneath the sealing means 40 particularly underneath the seam 42 wherein at the same time the performed opening 41 is at the inside reliably covered by the foot 22. This embodiment of the foot 22 according to FIG. 5 and FIG. 6 is applicable in all embodiments.

Figure 5:
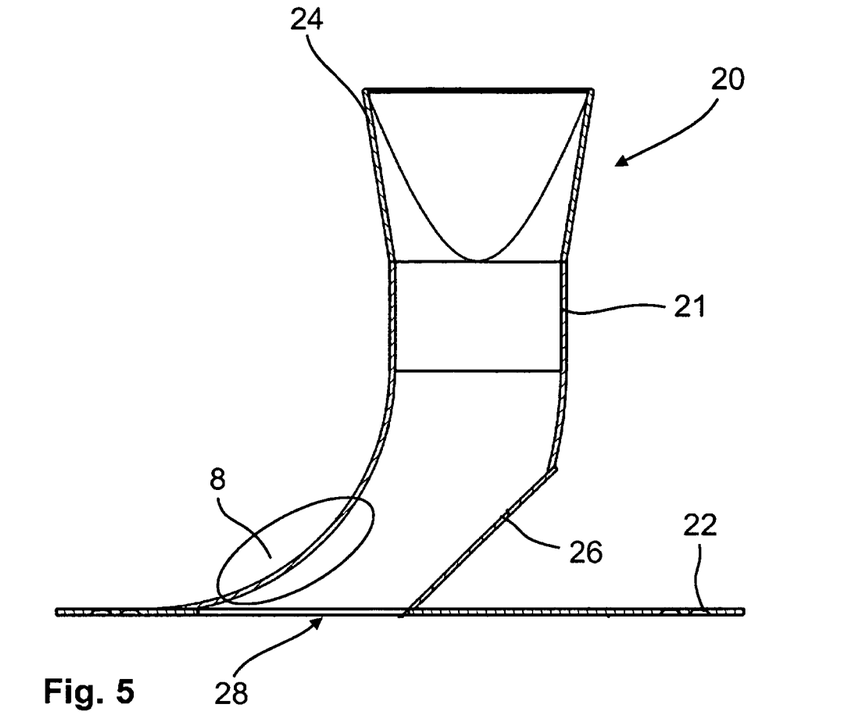
Figure 6:
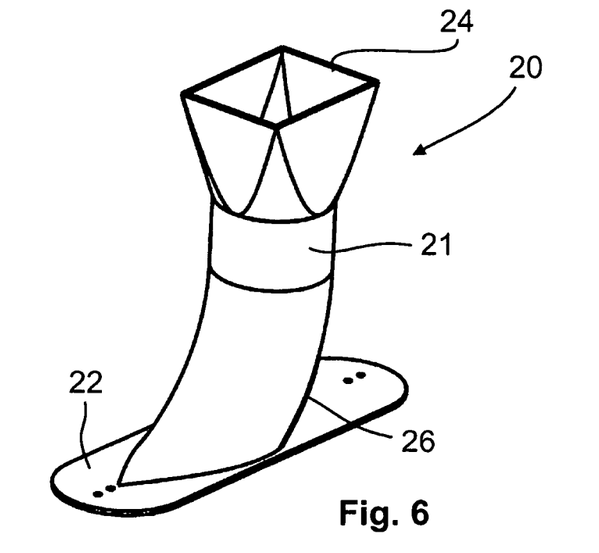

Moreover, the suction element 20 comprises a curved pipe 21 wherein the suction element 20 comprises an inlet area 24, in which the suction space 4 extends and an outlet area 28, which is directed in the direction of the suction chamber 10 and ends in there, wherein the outlet area 28 is tangentially directed to the suction chamber 10 (FIG. 5).

According to FIG. 5 the suction element 20 comprises a wall 26, which is assembled in the heel area of the curved suction element 20. The wall 26 serves for a corresponding flow rate and corresponding low pressure conditions within the suction elements 20, which counteract a possible congestion of the suction element 20 with waste products 10. The wall 26 serves for an increase of the flow resistance above the wall 26 wherein at the same time it is effectively prevented that in the shown area 8 according to FIG. 5 a destructive low pressure circumstance is adjusted, which can disadvantageously result in congestions. The guide plate 26 influences the flow within the suction elements 20 so that the waste product 2 can reach almost at the centre through the pipe 21 and through the outlet area 26 into the suction chamber 10. The guide plate 26 is tilted to the opening 41 of the inlet area 24. Moreover the inlet area 24 of the suction element 20 according to FIG. 5 and FIG. 6 comprises a rectangular cross section wherein the pipe 21 connected to the inlet area 24 comprises a circular cross section. Particularly the previously described embodiment of the inlet area 24 promotes additionally an advantageous entry of the waste products 2 into the suction element 20.

Figure 17:
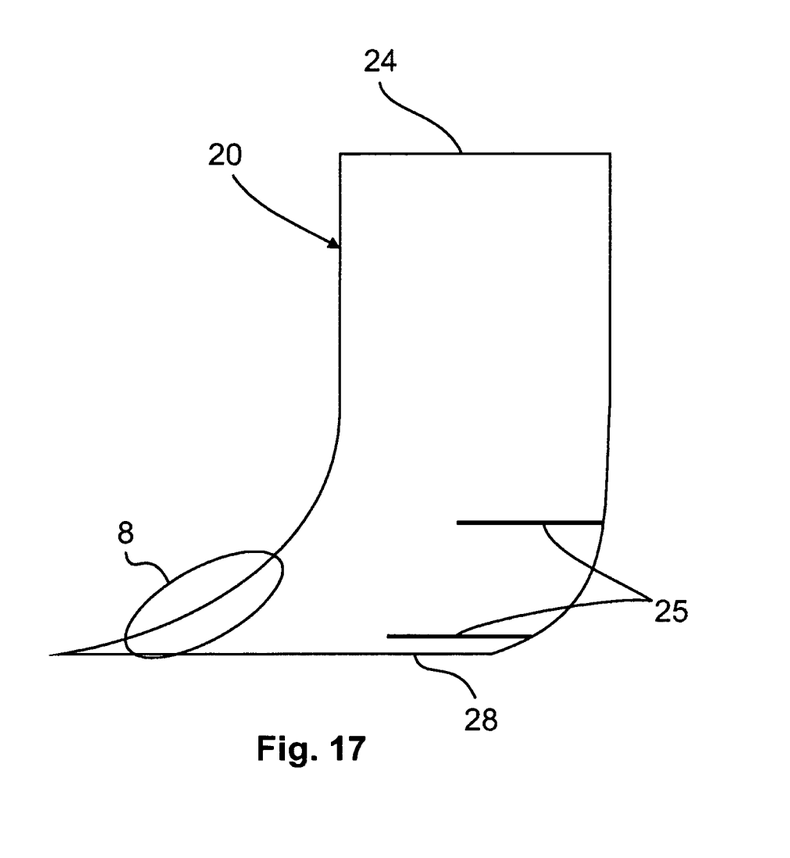

According to FIG. 17 a further possibility is shown in order to influence the flow rate within the suction element 20 wherein one or multiple covers 25 are assembled as walls within the suction element 20, which counteract in area 8 like already shown in FIG. 5 an arisen low pressure during the operation. Above the cover 25 a dynamic pressure develops whereby in a positive way the flow rate within the suction element 20 is influenced for the dipping waste products 2. Likewise in this embodiment the waste products 2 flow mainly central through the suction element 20 particularly through the outlet area 28 wherein a possible congestion of the suction element 20 within the suction process is counteracted.

Figure 16:
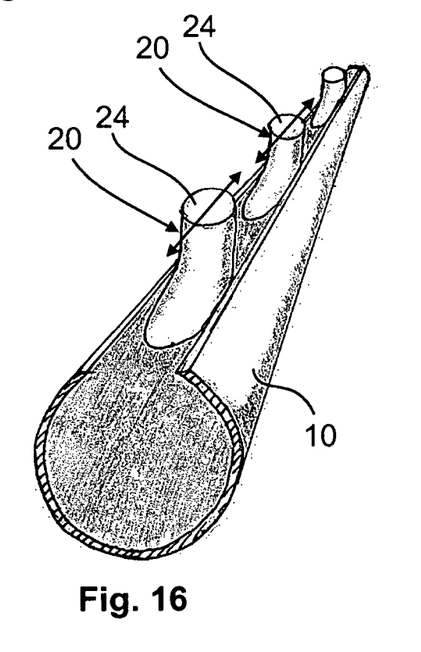

According to FIG. 16 it is shown that the suction chamber 10 can comprise a circular cross section. In the remaining embodiments the suction chamber 10 comprises a rectangular cross section. In order that a satisfactory low pressure during the operation within the suction chamber 10 appears the suction chamber 10 comprises a tapered shape in its cross section, which can be also named as conical in this context. The cross section of the suction chamber 10 is greater at the side facing at the suction unit 5 as the cross section at the side facing away from the suction unit 5. Herewith it is intended that almost all suction elements 20, which are connected in series comprise the same throughput. The carriage 23 according to FIG. 2 and FIG. 4 comprises a handle 27 so that the position of the suction element 20 and the suction space 4 is manually adjustable. The position of the carriage 23 can be arrested by a not explicitly shown arresting device. Likewise it can be intended that a gear, which is not explicitly shown adjusts the position of the carriage 23.

REFERENCE NUMBERS

1 Device
2 Waste product
3 Production machine
4 Suction space
5 Suction unit
6 Collecting trays
7 Pipe system
8 Area
10 Suction chamber
11 Bearing
12 Rail element
20 Suction element 21 Pipe
22 Foot
23 Carriage
24 Inlet area
25 Wall, resistance element, cover
26 Guide plate
27 Handle
28 Outlet area
40 Sealing means
41 Opening
42 Seam
43 Zipper
44 Zipper opener
45 Zipper lock
46 Axis
47 Telescope unit
48 Telescope element
49 Hook-and-loop fastener
50 Positioning gear
51 Flap segment
52 Magnetic tape

The invention claimed is:

1. A device for suction of waste products of a production machine with a suction chamber, at which at least one suction element is assembled, which projects in a suction space which is arranged outside the suction chamber in order to convey the waste products in the suction chamber, a suction unit in order to generate a low pressure in the suction chamber
wherein a sealing means, which abut against the suction element and which closes the suction chamber is performed in a way that the suction element is moveable along the sealing means wherein the position of the suction element is variably adjustable at the suction chamber, wherein the suction element comprises a foot assembled underneath the sealing means within the suction chamber,
wherein the sealing means comprises an opening for the suction element so that the suction element projects at least partially through the opening of the sealing means, wherein the suction element is displaceable along a sealing means wherein during the movement of the suction element the position of the opening of the sealing means moves along.

2. The device according to claim 1,
wherein the suction chamber comprises a bearing, at which the suction element is moveably mounted, particularly that the bearing is performed as a rail system.

3. The device according to claim 1,
wherein the sealing means comprises a seam which during the movement of the suction element opens at a defined position and at the same time closes at a defined position.

4. The device according to claim 1,
wherein the sealing means comprises at least one of the following features:
a blind sealing
a profile sealing
a zipper
a telescope element
a zip lock
a flap segment
a magnetic tape
a hook-and-loop fastener.

5. The device according to claim 1,
wherein the suction chamber comprises a tapered shape in its cross section wherein the cross section of the suction chamber is greater at the side facing the suction unit as the cross section of the side facing away from the suction unit.

6. The device according to claim 1,
wherein the suction element comprises a pipe wherein the suction element is arranged mainly outside the suction chamber wherein particularly the foot is evenly shaped and abuts at the sealing means at the inside of the suction chamber.

7. The device according to claim 1,
wherein the suction element comprises a carriage, which affects at the bearing, which is assembled outside the suction chamber.

8. The device according to claim 1,
wherein the suction element comprises an inlet area, which projects into the suction space and an outlet area, which is directed into the direction of the suction chamber wherein particularly the outlet area is tangentially directed to the suction chamber.

9. The device according to claim 1,
wherein the suction element comprises a curved shape wherein at least a wall is intended within the suction element in a way that a flow resistance occurs at the wall which serves that a remaining of waste products within the suction element is avoided.

10. The device according to claim 9,
wherein the wall is performed as a guide plate, which at least partially influences the geometric contour of the suction element particularly that the guide plate is tilted to the opening of the inlet area.

11. The device according to claim 1,
wherein the bearing comprises a rail element wherein particularly the suction element is linear displaceable.

12. The device according to claim 1,
wherein the suction element comprises a carriage, the carriage comprises a handle in order to manually displace the suction element along the suction chamber.

13. The device according to claim 1,
wherein the suction element comprises a carriage, the carriage is moveable by a gear.

14. The device according to claim 1,
wherein a plurality of suction elements is assembled at the suction chamber.

15. The device according to claim 1,
wherein the suction element is removably assembled at the suction chamber.

16. The device according to claim 1,
wherein the suction chamber comprises a rectangular form in its cross section.

17. The device according to claim 1,
wherein the inlet area of the suction element comprises a rectangular cross section wherein particularly the pipe extending from the inlet area comprises a circular cross section.

18. A production machine with a device for suction of waste products, the device comprises:
a suction chamber, at which at least one suction element is assembled, which extend in a suction space assembled outside the suction chamber in order to convey waste products in the suction chamber,
a suction unit in order to generate a low pressure in the suction chamber,
wherein a sealing means, which abuts against the suction element and which closes the suction chamber is performed in a way that the suction element is moveable along the sealing means wherein the position of the suction element is variably adjustable at the suction chamber, wherein the suction element comprises a foot assembled underneath the sealing means within the suction chamber,
wherein the sealing means comprises an opening for the suction element so that the suction element projects at least partially through the opening of the sealing means, wherein the suction element is displaceable along a sealing means wherein during the movement of the suction element the position of the opening of the sealing means moves along.

19. The production machine according to claim 18,
wherein the suction element comprises a carriage, the carriage is moveable by a gear to enable a horizontal displacement of the carriage.

20. The production machine according to claim 1 wherein the production machine is a sheet extruder.

21. The production machine according to claim 13 wherein the gear is an electric gear.

\* \* \* \* \*